(12) United States Patent
Kohout et al.

(10) Patent No.: US 11,245,675 B2
(45) Date of Patent: Feb. 8, 2022

(54) DEVICE DETECTION IN NETWORK TELEMETRY WITH TLS FINGERPRINTING

(71) Applicant: Cisco Technology, Inc., San Jose, CA (US)

(72) Inventors: Jan Kohout, Roudnice Nad Labem (CZ); Martin Kopp, Beroun (CZ); Jan Brabec, Rakovnik (CZ); Lukas Bajer, Liberec (CZ)

(73) Assignee: Cisco Technology, Inc., San Jose, CA (US)

( * ) Notice: Subject to any disclaimer, the term of this patent is extended or adjusted under 35 U.S.C. 154(b) by 157 days.

(21) Appl. No.: 16/686,364

(22) Filed: Nov. 18, 2019

(65) Prior Publication Data

US 2021/0152526 A1 May 20, 2021

(51) Int. Cl.
*H04L 29/06* (2006.01)
*H04L 12/26* (2006.01)

(52) U.S. Cl.
CPC .......... *H04L 63/0428* (2013.01); *H04L 43/08* (2013.01); *H04L 63/08* (2013.01); *H04L 63/1416* (2013.01); *H04L 63/1425* (2013.01); *H04L 63/166* (2013.01); *H04L 63/20* (2013.01)

(58) Field of Classification Search
CPC ............. H04L 63/1416; H04L 63/0428; H04L 63/166; H04L 63/20; H04L 63/1425; H04L 63/08; H04L 43/08
USPC ....................................................... 713/168
See application file for complete search history.

(56) References Cited

U.S. PATENT DOCUMENTS

| | | | |
|---|---|---|---|
| 10,425,434 B2 | 9/2019 | Kohout et al. | |
| 2016/0155128 A1* | 6/2016 | Desai ................ | G06Q 20/3227 705/44 |
| 2018/0337831 A1 | 11/2018 | Grill et al. | |
| 2019/0018955 A1 | 1/2019 | McGrew et al. | |
| 2019/0190950 A1 | 6/2019 | Senecal et al. | |
| 2019/0245866 A1 | 8/2019 | Anderson et al. | |
| 2019/0319977 A1* | 10/2019 | Gottschlich ......... | H04L 63/1408 |

OTHER PUBLICATIONS

HTTPS traffic analysis and client identification using passive SSL/TLS fingerprinting Martin Husák, Milan Cermák, Tomáš Jirsík and Pavel Celeda EURASIP Journal on Information Security (Year: 2016).*

(Continued)

*Primary Examiner* — Benjamin A Kaplan
(74) *Attorney, Agent, or Firm* — Behmke Innovation Group LLC; Kenneth J. Heywood; Jonathon P. Western

(57) ABSTRACT

In one embodiment, a traffic analysis service obtains telemetry data regarding encrypted traffic associated with a particular device in the network, wherein the telemetry data comprises Transport Layer Security (TLS) features of the traffic. The service determines, based on the TLS features from the obtained telemetry data, a set of one or more TLS fingerprints for the traffic associated with the particular device. The service calculates a measure of similarity between the set of one or more TLS fingerprints for the traffic associated with the particular device and a set of one or more TLS fingerprints of traffic associated with a second device. The service determines, based on the measure of similarity, that the particular device and the second device were operated by the same user.

20 Claims, 9 Drawing Sheets

(56) References Cited

OTHER PUBLICATIONS

TLS Fingerprinting—a method for identifying a TLS client without decrypting Kevin Stewart https://devcentral.f5.com/DEVC_GenerateArticlePdf?Id=kA01T000000DCvwSAG (May 2019).*

U.S. Appl. No. 16/512,474, Unpublished, Anderson et al.

Vijayanand Thangavelu et al., "DEFT: A Distributed IoT Fingerprinting Technique (IEEE IoT Journal)", ResearchGate, Aug. 2018, pp. 1-13.

Martin Husák et al., "Network-based HTTPS Client Identification Using SSL/TLS Fingerprinting", Researchgate, 2015 10th International Conference on Availability, Reliability and Security, Aug. 2015, 8 pages.

* cited by examiner

DEVICE DETECTION IN NETWORK TELEMETRY WITH TLS FINGERPRINTING

TECHNICAL FIELD

The present disclosure relates generally to computer networks, and, more particularly, to device detection in network telemetry with Transport Layer Security (TLS) fingerprinting.

BACKGROUND

Network traffic is becoming increasingly encrypted. Indeed, some studies estimate that more than 70% of all network traffic is now encrypted, with this figure expected to continue to grow. This presents a number of challenges to systems that monitor and model the behaviors of individual users and devices connected to a network. Indeed, approaches such as User Behavior Analytics (UBA) and User and Entity Behavior Analytics (UEBA) attempt to detect abnormal traffic behaviors in a network, which could indicate malicious activity. However, the use of traffic encryption, such as through the use of Transport Layer Security (TLS), makes this behavioral analysis difficult since the packets are opaque to traditional packet inspection.

Proper modeling of the behavior of a user and/or entity also requires a relatively long-term period of observation, to establish a baseline behavior. To do so, the analysis system must also be able to identify the user and/or entity on the network over the course of time. However, users often use multiple devices on the network (e.g., a phone and a computer). Moreover, the network identifier for a device, such as its Internet Protocol (IP) address, can also change over time and frustrate the effort to model its behavior on the network.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

Figure 1A:
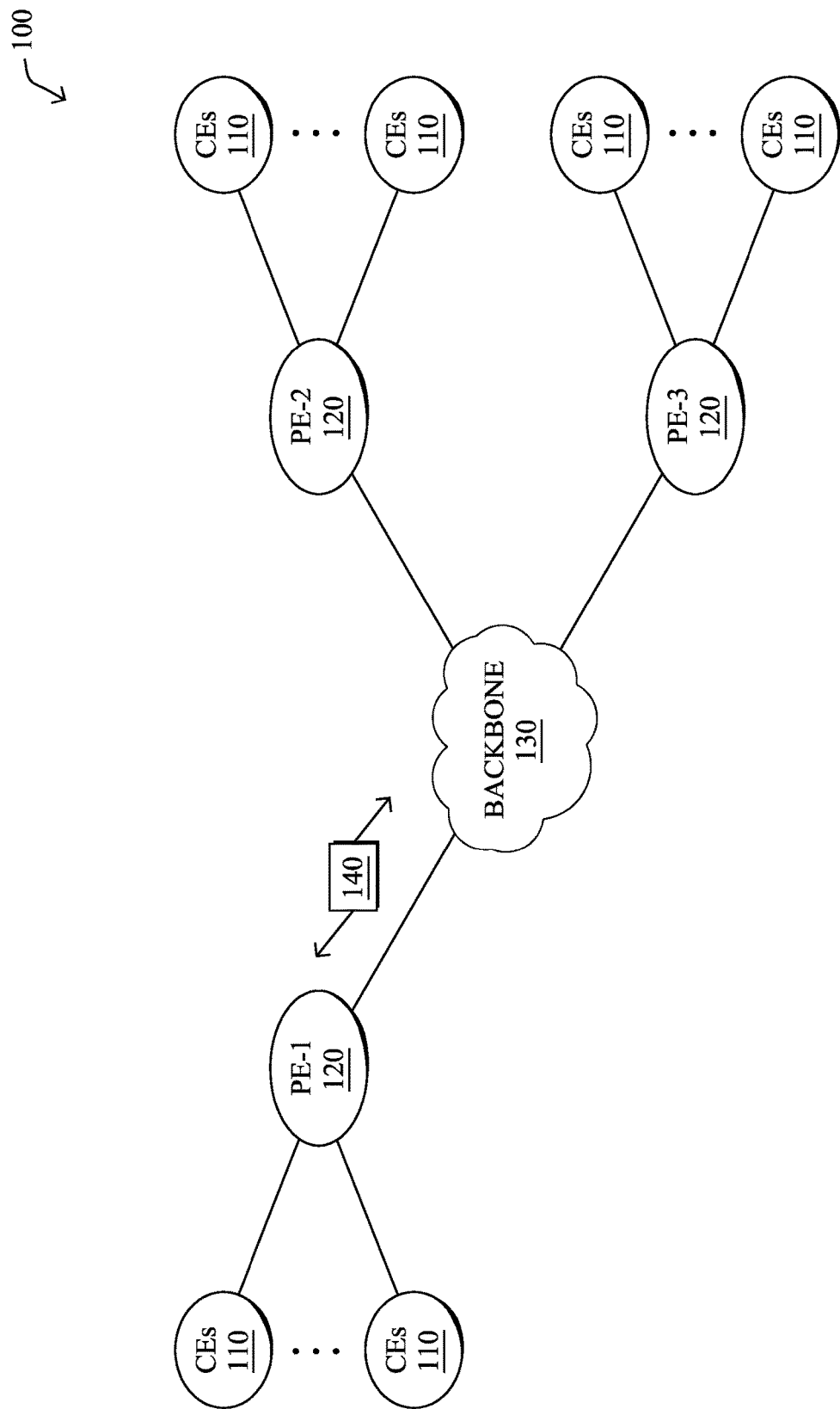
FIGS. 1A-1B illustrate an example communication network.

According to one or more embodiments of the disclosure, a traffic analysis service obtains telemetry data regarding encrypted traffic associated with a particular device in the network, wherein the telemetry data comprises Transport Layer Security (TLS) features of the traffic. The service determines, based on the TLS features from the obtained telemetry data, a set of one or more TLS fingerprints for the traffic associated with the particular device. The service calculates a measure of similarity between the set of one or more TLS fingerprints for the traffic associated with the particular device and a set of one or more TLS fingerprints of traffic associated with a second device. The service determines, based on the measure of similarity, that the particular device and the second device were operated by the same user.

Description

A computer network is a geographically distributed collection of nodes interconnected by communication links and segments for transporting data between end nodes, such as personal computers and workstations, or other devices, such as sensors, etc. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), or synchronous digital hierarchy (SDH) links, or Powerline Communications (PLC) such as IEEE 61334, IEEE P1901.2, and others. The Internet is an example of a WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol consists of a set of rules defining how the nodes interact with each other. Computer networks may further be interconnected by an intermediate network node, such as a router, to extend the effective "size" of each network.

Smart object networks, such as sensor networks, in particular, are a specific type of network having spatially distributed autonomous devices such as sensors, actuators, etc., that cooperatively monitor physical or environmental conditions at different locations, such as, e.g., energy/power consumption, resource consumption (e.g., water/gas/etc. for advanced metering infrastructure or "AMI" applications) temperature, pressure, vibration, sound, radiation, motion, pollutants, etc. Other types of smart objects include actuators, e.g., responsible for turning on/off an engine or perform any other actions. Sensor networks, a type of smart object network, are typically shared-media networks, such as wireless networks. That is, in addition to one or more sensors, each sensor device (node) in a sensor network may generally be equipped with a radio transceiver or other communication port, a microcontroller, and an energy source, such as a battery. Often, smart object networks are considered field area networks (FANs), neighborhood area networks (NANs), personal area networks (PANs), etc. Generally, size and cost constraints on smart object nodes (e.g., sensors) result in corresponding constraints on resources such as energy, memory, computational speed and bandwidth.

FIG. 1A is a schematic block diagram of an example computer network 100 illustratively comprising nodes/devices, such as a plurality of routers/devices interconnected by links or networks, as shown. For example, customer edge (CE) routers 110 may be interconnected with provider edge (PE) routers 120 (e.g., PE-1, PE-2, and PE-3) in order to communicate across a core network, such as an illustrative network backbone 130. For example, routers 110, 120 may be interconnected by the public Internet, a multiprotocol label switching (MPLS) virtual private network (VPN), or the like. Data packets 140 (e.g., traffic/messages) may be exchanged among the nodes/devices of the computer network 100 over links using predefined network communication protocols such as the Transmission Control Protocol/Internet Protocol (TCP/IP), User Datagram Protocol (UDP), Asynchronous Transfer Mode (ATM) protocol, Frame Relay protocol, or any other suitable protocol. Those skilled in the art will understand that any number of nodes, devices, links, etc. may be used in the computer network, and that the view shown herein is for simplicity.

In some implementations, a router or a set of routers may be connected to a private network (e.g., dedicated leased lines, an optical network, etc.) or a virtual private network (VPN), such as an MPLS VPN, thanks to a carrier network, via one or more links exhibiting very different network and service level agreement characteristics. For the sake of illustration, a given customer site may fall under any of the following categories:

1.) Site Type A: a site connected to the network (e.g., via a private or VPN link) using a single CE router and a single link, with potentially a backup link (e.g., a 3G/4G/5G/LTE backup connection). For example, a particular CE router 110 shown in network 100 may support a given customer site, potentially also with a backup link, such as a wireless connection.

2.) Site Type B: a site connected to the network using a CE router with two MPLS VPN links (e.g., from different service providers), with potentially a backup link (e.g., a 3G/4G/5G/LTE connection). A site of type B may itself be of different types:

2a.) Site Type B1: a site connected to the network using two MPLS VPN links (e.g., from different service providers), with potentially a backup link (e.g., a 3G/4G/5G/LTE connection).

2b.) Site Type B2: a site connected to the network using one MPLS VPN link and one link connected to the public Internet, with potentially a backup link (e.g., a 3G/4G/5G/LTE connection). For example, a particular customer site may be connected to network 100 via PE-3 and via a separate Internet connection, potentially also with a wireless backup link.

2c.) Site Type B3: a site connected to the network using two links connected to the public Internet, with potentially a backup link (e.g., a 3G/4G/5G/LTE connection).

Notably, MPLS VPN links are usually tied to a committed service level agreement, whereas Internet links may either have no service level agreement at all or a loose service level agreement (e.g., a "Gold Package" Internet service connection that guarantees a certain level of performance to a customer site).

3.) Site Type C: a site of type B (e.g., types B1, B2 or B3) but with more than one CE router (e.g., a first CE router connected to one link while a second CE router is connected to the other link), and potentially a backup link (e.g., a wireless 3G/4G/LTE backup link). For example, a particular customer site may include a first CE router 110 connected to PE-2 and a second CE router 110 connected to PE-3.

Figure 1B:
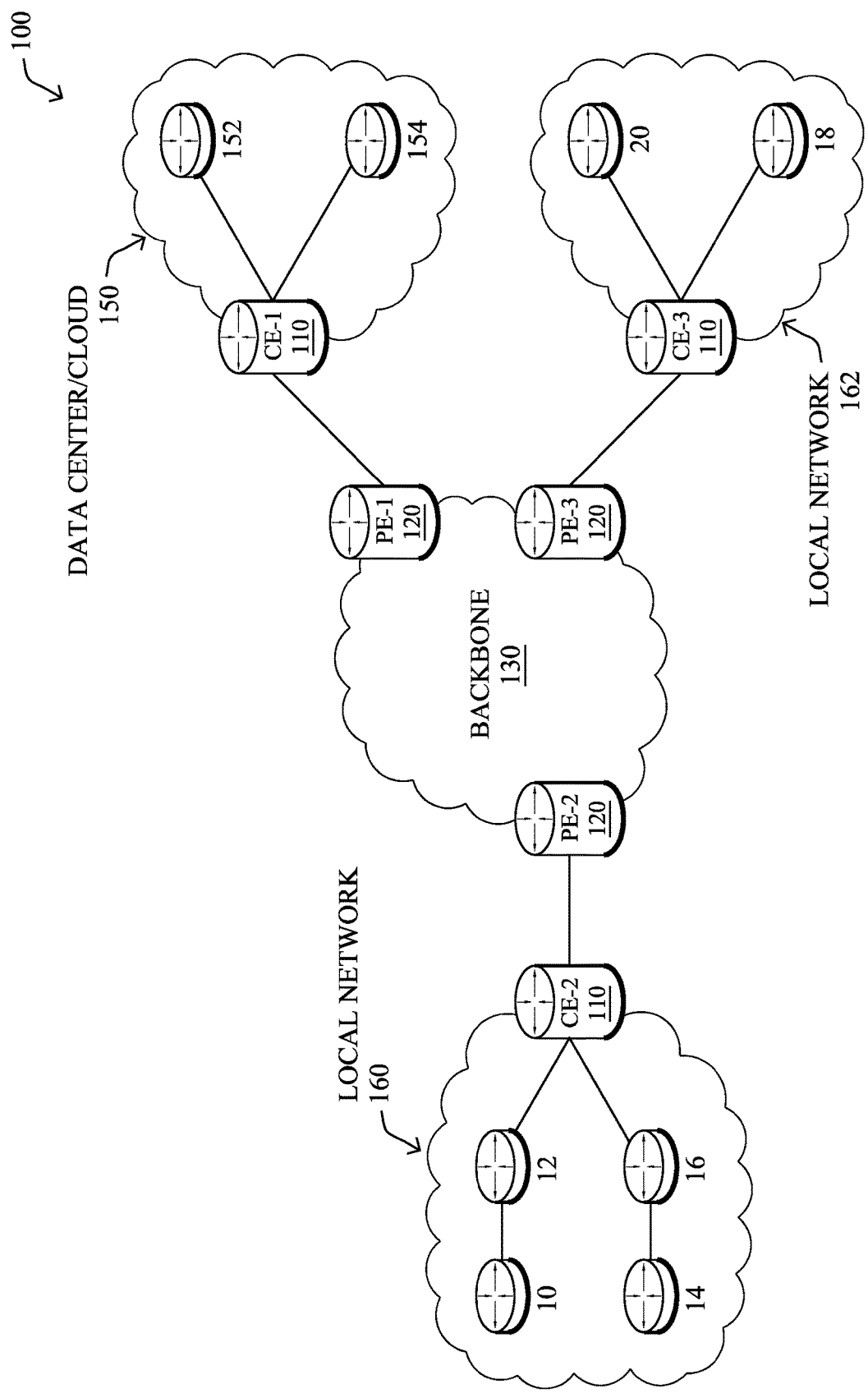

FIG. 1B illustrates an example of network 100 in greater detail, according to various embodiments. As shown, network backbone 130 may provide connectivity between devices located in different geographical areas and/or different types of local networks. For example, network 100 may comprise local networks 160, 162 that include devices/nodes 10-16 and devices/nodes 18-20, respectively, as well as a data center/cloud environment 150 that includes servers 152-154. Notably, local networks 160-162 and data center/cloud environment 150 may be located in different geographic locations.

Servers 152-154 may include, in various embodiments, a network management server (NMS), a dynamic host configuration protocol (DHCP) server, a constrained application protocol (CoAP) server, an outage management system (OMS), an application policy infrastructure controller (APIC), an application server, etc. As would be appreciated, network 100 may include any number of local networks, data centers, cloud environments, devices/nodes, servers, etc.

The techniques herein may also be applied to other network topologies and configurations. For example, the techniques herein may be applied to peering points with high-speed links, data centers, etc. Further, in various embodiments, network 100 may include one or more mesh networks, such as an Internet of Things network. Loosely, the term "Internet of Things" or "IoT" refers to uniquely identifiable objects/things and their virtual representations in a network-based architecture. In particular, the next frontier in the evolution of the Internet is the ability to connect more than just computers and communications devices, but rather the ability to connect "objects" in general, such as lights, appliances, vehicles, heating, ventilating, and air-conditioning (HVAC), windows and window shades and blinds, doors, locks, etc. The "Internet of Things" thus generally refers to the interconnection of objects (e.g., smart objects), such as sensors and actuators, over a computer network (e.g., via IP), which may be the public Internet or a private network.

Notably, shared-media mesh networks, such as wireless networks, etc., are often on what is referred to as Low-Power and Lossy Networks (LLNs), which are a class of network in which both the routers and their interconnect are constrained. In particular, LLN routers typically operate with highly constrained resources, e.g., processing power, memory, and/or energy (battery), and their interconnections are characterized by, illustratively, high loss rates, low data rates, and/or instability. LLNs are comprised of anything from a few dozen to thousands or even millions of LLN routers, and support point-to-point traffic (e.g., between devices inside the LLN), point-to-multipoint traffic (e.g., from a central control point such at the root node to a subset of devices inside the LLN), and multipoint-to-point traffic (e.g., from devices inside the LLN towards a central control point). Often, an IoT network is implemented with an LLN-like architecture. For example, as shown, local network 160 may be an LLN in which CE-2 operates as a root node for nodes/devices 10-16 in the local mesh, in some embodiments.

Figure 2:
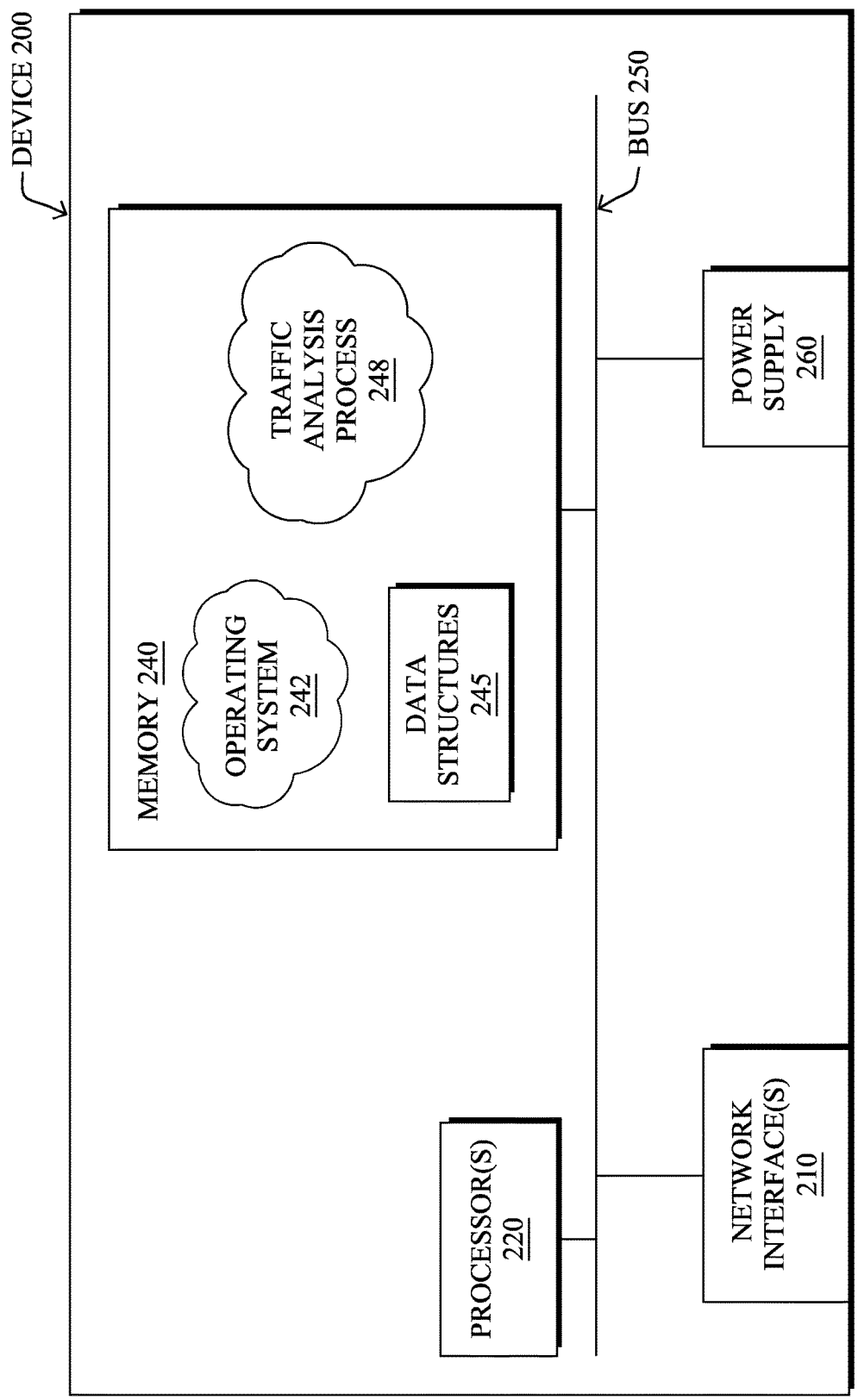
FIG. 2 illustrates an example network device/node.

FIG. 2 is a schematic block diagram of an example node/device 200 that may be used with one or more embodiments described herein, e.g., as any of the computing devices shown in FIGS. 1A-1B, particularly the PE routers 120, CE routers 110, nodes/device 10-20, servers 152-154 (e.g., a network controller located in a data center, etc.), any other computing device that supports the operations of network 100 (e.g., switches, etc.), or any of the other devices referenced below. The device 200 may also be any other suitable type of device depending upon the type of network architecture in place, such as IoT nodes, etc. Device 200 comprises one or more network interfaces 210, one or more processors 220, and a memory 240 interconnected by a system bus 250, and is powered by a power supply 260.

The network interfaces 210 include the mechanical, electrical, and signaling circuitry for communicating data over physical links coupled to the network 100. The network interfaces may be configured to transmit and/or receive data using a variety of different communication protocols. Notably, a physical network interface 210 may also be used to implement one or more virtual network interfaces, such as for virtual private network (VPN) access, known to those skilled in the art.

The memory 240 comprises a plurality of storage locations that are addressable by the processor(s) 220 and the network interfaces 210 for storing software programs and data structures associated with the embodiments described herein. The processor 220 may comprise necessary elements or logic adapted to execute the software programs and manipulate the data structures 245. An operating system 242 (e.g., the Internetworking Operating System, or IOS®, of Cisco Systems, Inc., another operating system, etc.), portions of which are typically resident in memory 240 and executed by the processor(s), functionally organizes the node by, inter alia, invoking network operations in support of software processors and/or services executing on the device. These software processors and/or services may comprise a traffic analysis process 248.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while processes may be shown and/or described separately, those skilled in the art will appreciate that processes may be routines or modules within other processes.

In general, traffic analysis process 248 may execute one or more machine learning-based classifiers to identify the source of encrypted traffic in the network for any number of purposes. In one embodiment, traffic analysis process 248 may assess captured telemetry data regarding one or more traffic flows, to determine whether a given traffic flow or set of flows are caused by malware in the network, such as a particular family of malware applications. Example forms of traffic that can be caused by malware may include, but are not limited to, traffic flows reporting exfiltrated data to a remote entity, spyware or ransomware-related flows, command and control (C2) traffic that oversees the operation of the deployed malware, traffic that is part of a network attack, such as a zero day attack or denial of service (DoS) attack, combinations thereof, or the like. In further embodiments, traffic analysis process 248 may identify the process, device, or user associated with the encrypted traffic, without actually decrypting the traffic.

Traffic analysis process 248 may employ any number of machine learning techniques, to identify the process, device, and/or user associated with encrypted traffic based on the observed telemetry data. In general, machine learning is concerned with the design and the development of techniques that receive empirical data as input (e.g., telemetry data regarding traffic in the network) and recognize complex patterns in the input data. For example, some machine learning techniques use an underlying model M, whose parameters are optimized for minimizing the cost function associated to M, given the input data. For instance, in the context of classification, the model M may be a straight line that separates the data into two classes (e.g., labels) such that $M=a*x+b*y+c$ and the cost function is a function of the number of misclassified points. The learning process then operates by adjusting the parameters a,b,c such that the number of misclassified points is minimal. After this optimization/learning phase, traffic analysis process 248 can use the model M to classify new data points, such as information regarding new traffic flows, devices, users, or processes in the network. Often, M is a statistical model, and the cost function is inversely proportional to the likelihood of M, given the input data.

In various embodiments, traffic analysis process 248 may employ one or more supervised, unsupervised, or semi-supervised machine learning models. Generally, supervised learning entails the use of a training set of data, as noted above, that is used to train the model to apply labels to the input data. For example, the training data may include sample telemetry data that has been labeled with an associated process, device, or user, if known. On the other end of the spectrum are unsupervised techniques that do not require a training set of labels. Notably, while a supervised learning model may look for previously seen patterns that have been labeled as such, an unsupervised model may instead look to whether there are sudden changes in the behavior of the network traffic.

Semi-supervised learning models take a middle ground approach that uses a greatly reduced set of labeled training data.

Example machine learning techniques that traffic analysis process 248 can employ may include, but are not limited to, nearest neighbor (NN) techniques (e.g., k-NN models, replicator NN models, etc.), statistical techniques (e.g., Bayesian networks, etc.), clustering techniques (e.g., k-means, mean-shift, etc.), artificial neural networks (ANNs) (e.g., convolutional neural networks, deep learning networks, etc.), support vector machines (SVMs), logistic or other regression, Markov models or chains, principal component analysis (PCA) (e.g., for linear models), multi-layer perceptron (MLP) ANNs (e.g., for non-linear models), replicating reservoir networks (e.g., for non-linear models, typically for time series), random forest classification, or the like.

In some cases, traffic analysis process 248 may assess the captured telemetry data on a per-flow basis. In other embodiments, traffic analysis process 248 may assess telemetry data for a plurality of traffic flows based on any number of different conditions. For example, traffic flows may be grouped based on their sources, destinations, temporal characteristics (e.g., flows that occur around the same time, etc.), combinations thereof, or based on any other set of flow characteristics.

Figure 3:
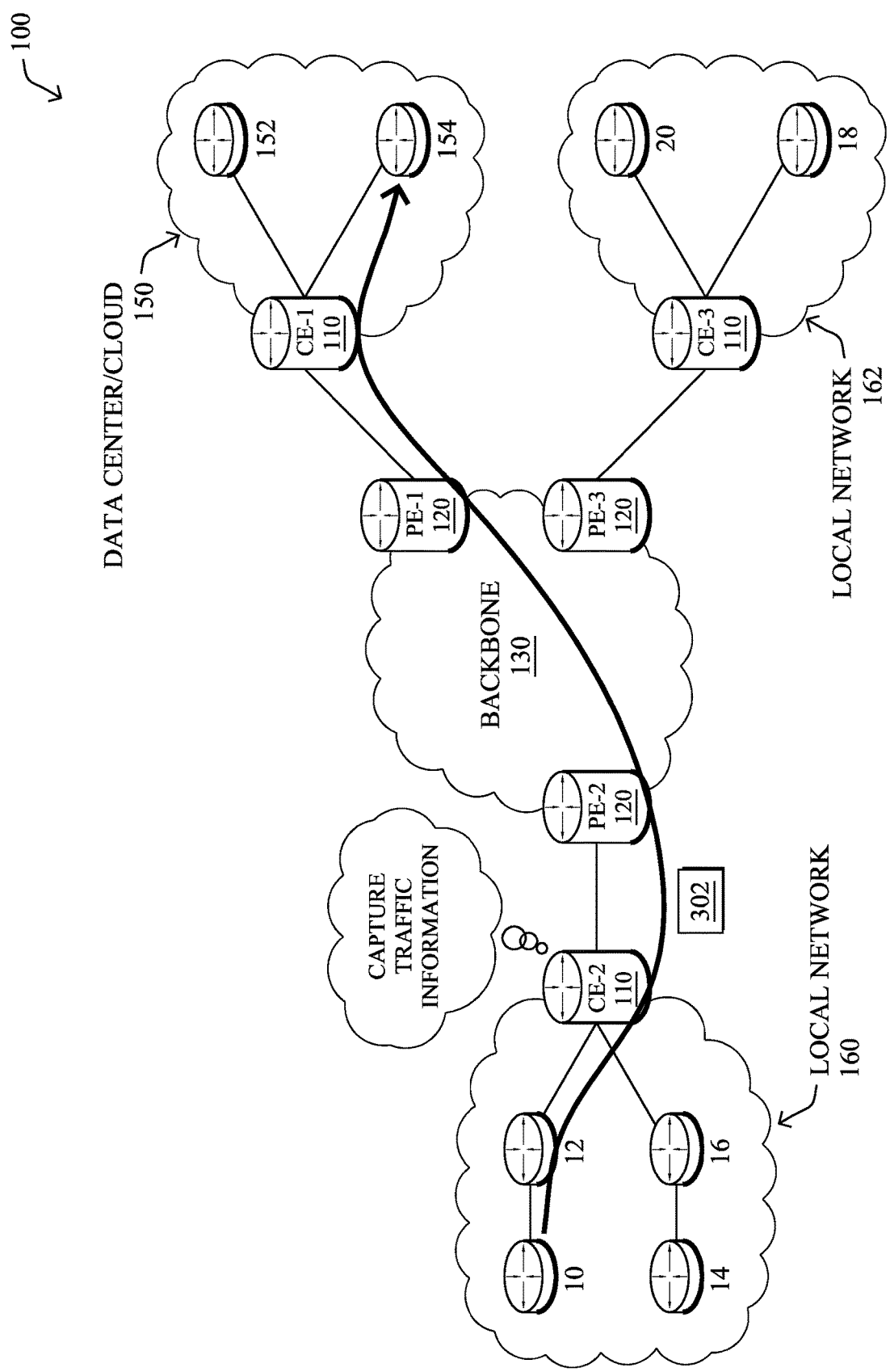
FIG. 3 illustrates an example of a device capturing traffic information.

As shown in FIG. 3, various mechanisms can be leveraged to capture information about traffic in a network, such as telemetry data regarding an encrypted traffic flow. For example, consider the case in which client node 10 initiates a traffic flow with remote server 154 that includes any number of packets 302. Any number of networking devices along the path of the flow may analyze and assess packet 302, to capture telemetry data regarding the traffic flow. For example, as shown, router CE-2 through which the traffic between node 10 and server 154 flows may capture telemetry data regarding the traffic flow.

In some embodiments, a networking device may analyze packet headers, to capture feature information about the traffic flow. For example, router CE-2 may capture the source address and/or port of host node 10, the destination address and/or port of server 154, the protocol(s) used by packet 302, or other header information by analyzing the header of a packet 302. Example captured features may include, but are not limited to, Transport Layer Security (TLS) information (e.g., from a TLS handshake), such as the ciphersuite offered, user agent, TLS extensions (e.g., type of encryption used, the encryption key exchange mechanism, the encryption authentication type, etc.), HTTP information (e.g., URI, etc.), Domain Name System (DNS) information, or any other data features that can be extracted from the observed traffic flow(s).

In further embodiments, the device may also assess the payload of the packet to capture information about the traffic flow. For example, router CE-2 or another device may perform deep packet inspection (DPI) on one or more of packets 302, to assess the contents of the packet. Doing so may, for example, yield additional information that can be used to determine the application associated with the traffic flow (e.g., packets 302 were sent by a web browser of node 10, packets 302 were sent by a videoconferencing application, etc.). However, as would be appreciated, a traffic flow may also be encrypted, thus preventing the device from assessing the actual payload of the packet. In such cases, the characteristics of the application can instead be inferred from the captured header information.

The networking device that captures the flow telemetry data may also compute any number of statistics or metrics regarding the traffic flow. For example, CE-2 may determine the start time, end time, duration, packet size(s), the distribution of bytes within a flow, etc., associated with the traffic flow by observing packets 302. In further examples, the capturing device may capture sequence of packet lengths and time (SPLT) data regarding the traffic flow, sequence of application lengths and time (SALT) data regarding the traffic flow, or byte distribution (BD) data regarding the traffic flow.

Figure 4:
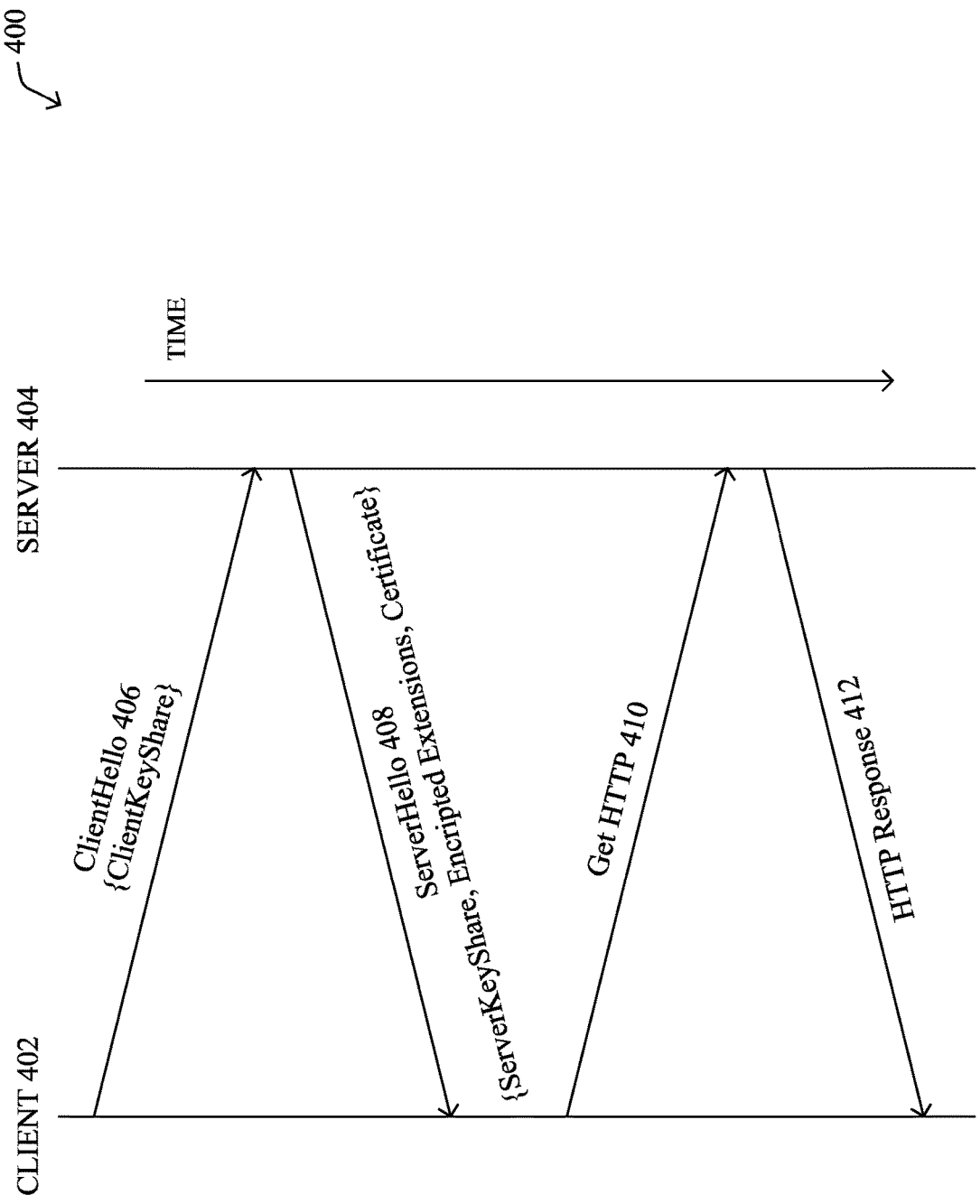
FIG. 4 illustrates an example encrypted session.

FIG. 4 illustrates an example encrypted session 400 between a client 402 and a server 404. As shown, client 402 may begin by initiating a handshake with server 404 in which cryptographic information is first exchanged. This cryptographic information can then be used by client 402 and server 404, to encrypt subsequent messages between the two. In particular, client 402 may send a ClientHello message 406 to server 404, thereby signifying that client 402 wishes to establish an encrypted session with server 404. Note that, in some cases, client 402 and server 404 may first perform a SYN-ACK, to establish the TCP/IP connection via which ClientHello message 406 may be sent.

In various cases, ClientHello message 406 may include cryptographic keys for client 402 that can be used by server 404 to immediately begin encrypting the messages sent by server 404 back to client 402. This is the approach taken by some encryption mechanisms, such as TLS version 1.3. In prior versions of TLS, and in other schemes, the key exchange is performed only after an exchange of Hello messages.

In response to receiving ClientHello message 406, server 404 may generate and send a ServerHello message 408 back to client 402. Such a ServerHello message 408 may include the server key information for server 404, extensions, and the server certificate of server 404, which may be encrypted using the client keys sent by client 402 as part of ClientHello message 406. Client 402 can then use its own keys to decrypt ClientHello message 406 and begin encrypting its subsequent messages based on the information included in Server-Hello message 408. For example, client 402 may use the server certificate included in ServerHello message 408 to authenticate server 404 and the server keys and extensions included in ServerHello message 408 to control the encryption of a GET HTTP message 410 sent by client 402 to server 404. In turn, server 404 can use the information that it obtained from the handshake, to encrypt an HTTP response message 412 sent to client 402 in response to message 410.

One or more intermediary networking devices (e.g., a switch, router, firewall, etc.) located along the path between client 402 and service 404 may capture telemetry data from messages 406-412 of encrypted session 400. For example, ClientHello message 406 may include information such as the version of TLS that client 402 wishes to use, a sessionID, the ciphersuite(s) offered, the compression method, TLS extensions such as Server Name Indication (SNI), Heartbeat, and the like.

As noted above, in systems that monitor and model the behavior of individual users and devices connected to a network, such as in the case of User Behavior Analytics (UBA) and User and Entity Behavior Analytics (UEBA), it is critical to consistently recognize and identify the devices independently on their current location in the network (e.g., their IP addresses, etc.). Moreover, such behavioral analysis systems need to construct long-term, baseline models of the behaviors of the users/devices, to achieve good accuracy. For this, the system needs to correctly distinguish when an already, known device just changed its IP address and when a user started to use a completely new, and possibly not allowed, device. With traffic becoming increasingly encrypted, the identification of individual devices and users based on commonly used features of their network traffic becomes more and more challenging as the information is very limited.

One common approach to dealing with encrypted traffic is to deploy a man-m-the-middle proxy in the network. During operation, such a proxy may intercept the ClientHello message sent by the client towards a server and, in turn, send its own ClientHello message on to the server. Similarly, the proxy may send its own ServerHello back to the requesting client. In other words, both the client and server may believe that they are communicating directly with one another when, in fact, they are each communicating with the proxy. By doing so, the proxy will have intercepted they keying information for both endpoints, allowing the proxy to decrypt their respective messages.

While a man-in-the-middle proxy can address the security challenges presented by encrypted traffic, decryption of the actual messages may be undesirable, at best, and illegal, at worst. Indeed, many jurisdictions now have privacy laws in place to protect certain types of data such as medical records, financial information, and the like.

Another potential solution would be to employ the use of an identity management system in the network and require each user and device to log in. However, such solutions increase the cost and complexity of the network, as well as creating a large administrative task. In addition, these approaches are also not well suited for 'open' networks that provide connectivity to guest devices.

Device Detection in Network Telemetry with TLS Fingerprinting

The techniques herein allow for the identification and tracking of individual devices and users connected to a computer network across different network identifiers (e.g., IP addresses, etc.). In some aspects, the techniques herein leverage fingerprints of TLS connections, to help identify and track users and devices across different network identifiers. In addition, the techniques herein are able to do so in a passive way that does not require the active probing of devices nor installation of specialized software on the devices.

Specifically, according to one or more embodiments of the disclosure as described in detail below, a traffic analysis service obtains telemetry data regarding encrypted traffic associated with a particular device in the network, wherein the telemetry data comprises Transport Layer Security (TLS) features of the traffic. The service determines, based on the TLS features from the obtained telemetry data, a set of one or more TLS fingerprints for the traffic associated with the particular device. The service calculates a measure of similarity between the set of one or more TLS fingerprints for the traffic associated with the particular device and a set of one or more TLS fingerprints of traffic associated with a second device. The service determines, based on the measure of similarity, that the particular device and the second device were operated by the same user.

Illustratively, the techniques described herein may be performed by hardware, software, and/or firmware, such as in accordance with the traffic analysis process 248, which may include computer executable instructions executed by the processor 220 (or independent processor of interfaces 210) to perform functions relating to the techniques described herein.

Operationally, the techniques herein leverage the concept of a TLS fingerprint, to identify the user and/or device that initiates an encrypted TLS session in a network. In general, a 'fingerprint' is a sequence of bytes formed by parsing (some of) the fields of a network session, selecting some bytes from some of those fields, and then optionally normalizing them. Similarly, a 'signature' is a rule that is based on the fields of packet headers (including destination port) and patterns that can appear in the data stream of the session, or in a particular field. Likewise, a 'watchlist' refers to a set of IP addresses that identifies compromised or malicious Internet servers, or other important categories of devices.

Figure 5:
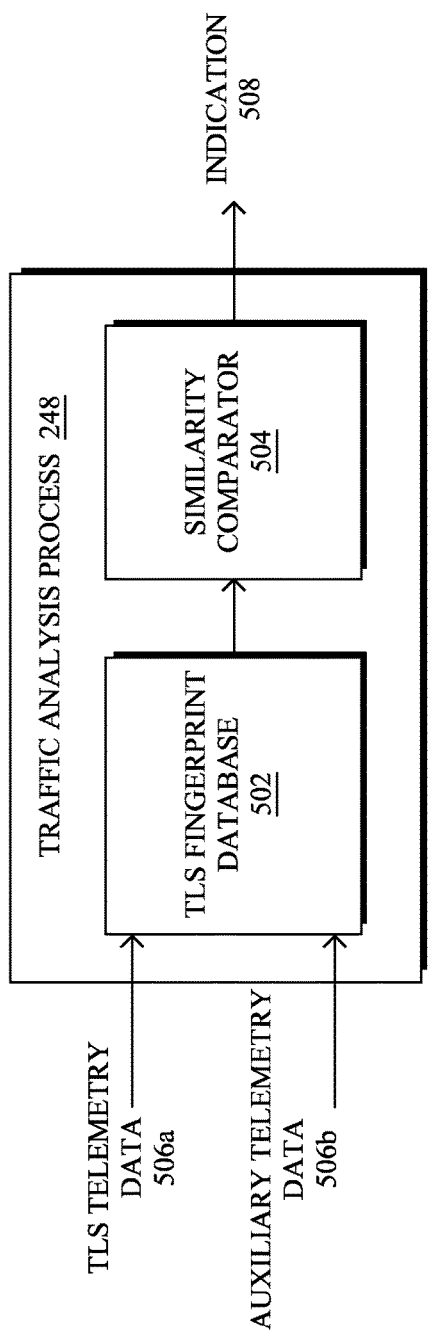
FIG. 5 illustrates an example architecture for device and user tracking in a network.

FIG. 5 illustrates an example architecture 500 for device and user tracking in a network, according to various embodiments. At the core of architecture 500 is traffic analysis process 248 which may comprise the following components: a TLS fingerprint database 502 and a similarity comparator 504. These components 502-504 may be implemented in a distributed manner or implemented on a single device. In addition, some or all of components 502-504 may be implemented as part of a monitored network (e.g., at the network edge, internal to the network, etc.) or part of a cloud-based device classification service. For example, in some implementations, a cloud-based device classification service may receive telemetry data captured from a network and return an indication of the identified user and/or device back to the network. The functionalities of the components 502-504 of architecture 500 may also be combined, omitted, or implemented as part of other processes, as desired.

As shown, traffic analysis process 248 may receive telemetry data 506a-506b from any number of devices in the network regarding an encrypted traffic session. For example, traffic analysis process 248 may receive telemetry data 506a-506b from any number of switches, routers, firewalls, or other intermediate networking devices located between endpoints of the traffic session. In further cases, traffic analysis process 248 may receive at least a portion of telemetry data 506a-506b directly from an endpoint of the encrypted session.

According to various embodiments, traffic analysis process 248 may construct and maintain a TLS fingerprint database 502 based on the received telemetry data 506a-506b. In some embodiments, a fingerprint in TLS fingerprint database 502 may take the form of a string, such as an octet string, derived from observations of a single network session by extracting carefully selected substrings from that data stream in such a way that the fingerprint is identical across each session initiated by a particular process.

According to various embodiments, the captured TLS fingerprint data in TLS telemetry data 506a for an encrypted session may also be augmented with auxiliary/contextual information in auxiliary telemetry data 506b regarding the destination and timing information for the session (e.g., time and/or date). For example, telemetry data 506b may include any or all of the following information:

The destination IP address of the encrypted session
The destination port of the encrypted session
The destination host/server name (e.g., from the SNI extension)
Timing information for the session, such as the day and time of the session As shown, traffic analysis process 248 may construct TLS fingerprint database 502 based on the obtained telemetry data 506a-506b. When implemented as part of a cloud service, TLS fingerprint database 502 may be constructed from potentially billions of observed encrypted sessions across any number of different networks. In addition to the name and hash (e.g., SHA-256) of each process, database 502 may also include a set of contextual data observed for a given process/TLS fingerprint pair:

A list of destination IP addresses (with their frequency count)
A list of destination ports (with their frequency count)
A list of server names taken from the server_name extension (with their frequency count)
Overall counts, and counts limited to recent time windows (e.g., last 30 days)

In other words, traffic analysis process 248 may construct database 502 by obtaining telemetry data 506a-506b regarding many network sessions. Then, for each session, traffic analysis process 248 may extract the TLS fingerprint from TLS telemetry data 506a and then incrementing the frequency count of each destination address, destination port, and/or server name indicated by auxiliary telemetry data 506b regarding the encrypted session.

More specifically, in some embodiments, the schema for TLS fingerprint database 502 may include four main sections: 1.) a set of metadata fields that provide some general information about the fingerprint, 2.) TLS features, 3.) process information, and 4.) OS information. An overview of an example schema for database 502 is as follows:

```
{
    "str_repr": "...", // Fingerprint metadata objects
    "md5_repr": "...",
    "source": ["...."], "count": z,
    "count_nvm": y,
    "count_dmz": x,
    "count_tg": w,
    "max_implementation_date": "...",
    "min_implementation_date": "...",
    "tls_features": {...}, // Human-readable description of TLS features
    "process_info": [...], // List of associated process information objects
    "os_info": [...], // List of associated OS information objects
}
```

In some embodiments, the schema of TLS fingerprint database 502 may also include information captured from a malware and/or threat intelligence service, such as Threat-Grid by Cisco Systems, Inc. For example, such information may include the process objects or OS objects used by the service, allowing for greater integration between traffic analysis process 248 and the service.

An example of the schema for the metadata fields is as follows:

```
{
    "str_repr":
    "(0301)(003900380033003200350002f00ff)((0000)(0023))",
    "md5_repr": "89f96e9f19fd8754d9965ede7937a7b3",
    "source": ["dmz","nvm","tg"],
    "count": 691285,
    "count_nvm": 124081,
    "count_dmz": 566208,
    "count_tg": 996,
    "max_implementation_date": "2010-02",
    "min_implementation_date": "2002-06",
    ...
}
```

Similarly, an example schema for the TLS features is as follows:

```
{
    ...
    "tls_features":
    {
        "version": "TLS 1.0",
        "cipher_suites":
        [
            "TLS_DHE_RSA_WITH_AES_256_CBC_SHA",
            "TLS_DHE_DSS_WITH_AES_256_CBC_SHA",
            "TLS_DHE_RSA_WITH_AES_128_CBC_SHA",
            "TLS_DHE_DSS_WITH_AES_128_CBC_SHA",
            "TLS_RSA_WITH_AES_256_CBC_SHA",
            "TLS_RSA_WITH_AES_128_CBC_SHA",
            "TLS_EMPTY_RENEGOTIATION_INFO_SCSV"
        ],
        "extensions":
        [
            {"server_name": ""},
            {"session_ticket": ""}
        ]
    },
    ...
}
```

The process information, which may be included in telemetry data 502b, may be captured and reported by an endpoint agent executed locally by the endpoint client. For example, Network Visibility Module (NVM) by Cisco Systems, Inc., or another suitable monitoring mechanism, may capture information about the process that initiates an encrypted traffic session in the network. An example of the schema for the process information in TLS fingerprint database 502 is as follows:

```
{
    ...
    "process_info": [
        {
            "process": "Python",
            "application_category": "programming",
            "count": 82383,
            "prevalence": 0.664,
            "first_seen": "2018-05-07",
            "last_seen": "2018-05-18",
            "count_last_7_days": 0,
            "count_last_30_days": 0,
            "sha256":
"A45244F6DCF841A6C165438BB16D074487A3BB1E83D705CBFB24690C3E09DCAE",
            "sha_db":
            {
            "filename": "Python",
            "file_version": "2.7.10",
            "product_name": "Python",
            "product_version": "2.7.10",
            "CVE_info": [ "CVE-2017-1000158",
            ...
            ]
        },
        "unique_hosts": 1,
        "hostnames":
        {
            "foo.test": 49894,
            "coincheck.com": 18016,
            ...
        },
        "dst_ips":
        {
            "203.167.51.36": 49894,
            "52.222.206.238": 7638,
            ...
        },
```

```
        "dst_port": {
        "443": 82383,
        }
    },
    ...
    ],
    ...
}
```

In cases in which the endpoint client executes a monitoring agent, the process information can be further augmented with additional information. For example, below shows an example of the schema for such process information:

```
{
    ...
    "process_info": [
    {
        "filename": "2361757781.exe",
        "sha1": "0ccaee90325287d4de4e3a73a2738bfadbe97692",
        "count": 4,
        "prevalence": 0.0046,
        "av_sigs": [
            "Riskware.Win32.Lazagne.esgdvk",
            ...
        ],
        "hostnames": {
            "www.python.org": 2,
            ... },
        "dst_ips": {"23.253.135.79": 2, ... },
        "dst_ports": { "443": 4 } }, ... ],
    ... }
```

Finally, an example of the schema for the OS information from auxiliary telemetry data 506*b* is as follows:

```
{
        ...
        "os_info": [
        {
            "os": "Mac OS X",
            "os_version": "10.11.6",
            "os_edition": "El Capitan",
            "count": 25202,
            "prevalence": 0.9889,
        },
        ...
        ]
    }
```

According to various embodiments, traffic analysis process 248 may also include similarity comparator 504 that is configured to identify an association between a particular device and a particular user. For example, similarity comparator 504 may, based on TLS fingerprint database 502, identify any or all of the following conditions in the network:

A given user operating multiple devices on the network

A device operated by a particular user transitioning from one network identifier to another As noted, network security solutions need to build long-term behavioral models of monitored devices, in order to accurately detect illegitimate and policy-violating events. However, identification of a device based on its assigned IP address is not reliable enough because such identifier may change over time. For example, a cell phone can change its IP address based on the location where it is connected to the network, a DHCP lease timeout may occur, etc. Furthermore, a user may operate multiple devices on the network (e.g., a computer and a mobile phone, etc.) and there can be also many IoT devices that do not report any username logged onto them.

In general, a TLS fingerprint in TLS fingerprint database 502 may be any compact representation of the parameters and settings of a TLS communication. For example, each fingerprint in database 502 may take the form of a string or hash of values extracted from the ClientHello and/or ServerHello packets exchanged between endpoints during initialization of the encrypted session.

It should be noted that while the techniques herein may use a centralized fingerprint database, in some embodiments, the fingerprinting techniques herein can also be performed on the fly and without a centralized database, in further embodiments. More specifically, the TLS fingerprints can also be extracted on the fly for each device, individually, and then used to compare the behaviors of devices or users. Such an implementation would require less overhead than in the centralized database case, as a centralized fingerprint database would need to be maintained over time.

In various embodiments, similarity comparator 504 may construct and maintain a behavioral model for each device for which a TLS fingerprint in TLS fingerprint database 502 was captured. Such a model may model the TLS fingerprints observed for that device and/or their timing information. For example, a behavioral model in similarity comparator 504 may predict the probabilities of a certain device exhibiting a set of one or more TLS fingerprints. In some embodiments, the behavioral model may take the form of a machine learning-based model, other statistical model, or the like.

Similarity comparator 504 may further compare the behavioral models of the different devices observed in the network, to identify devices that are, or were, operated by the same user. In various embodiments, similarity comparator 504 may do so by calculating a measure of similarity between the one or more TLS fingerprints associated with one device with the one or more TLS fingerprints associated with another device.

In one embodiment, similarity comparator 504 may compute the measure of similarity between two devices as a Jaccard similarity between their respective sets of TLS fingerprints from TLS fingerprint database 502. In another embodiment, similarity comparator 504 may compute the measure of similarity as a likelihood measure, such as in the case where similarity comparator 504 models the behaviors of each device using predictive/probabilistic models. In yet another embodiment, similarity comparator 504 may compute the measure of similarity using a histogram-based approach, such as computing a cosine similarity, Kullback-Leibler divergence, or the like.

If similarity comparator 504 determines that two devices on the network exhibit a measure of similarity between their TLS fingerprints that exceeds a predefined threshold, similarity comparator 504 may determine that the two devices are, or were, operated by the same user. Such a threshold may be set manually or based on whether the measure of similarity is considered to be statistically significant. Otherwise, if the measure of similarity is below the threshold, similarity comparator 504 may determine that the two devices are, or were, operated by different users.

In one embodiment, similarity comparator 504 may also take into account timing information, as well as a measure of similarity, to determine whether two devices are, in fact, the same device. For example, if the TLS fingerprint(s) exhibited by a device A during a first timespan closely match that of a device B during a second timespan, this may indicate that device A has simply been assigned to a different network identifier, such as a different IP address. This is particularly true if device A ceases to exhibit those TLS fingerprints after that initial time period. Conversely, if the TLS fingerprints of device A are observed again after being observed for device B, this could instead indicate that devices A and B are different devices, but were operated by the same user.

Based on its analysis, similarity comparator 504 may output an indication 508 as to whether two or more devices in the exhibited the same or similar TLS fingerprints and, optionally, whether the two devices are the same device with different network identifiers. Such an indication 508 could, for example, be used by a network security system that assesses the behaviors of users and devices on the network. More specifically, in some embodiments, assume that the network employs machine learning-based analytics, to detect malware and other security threats (e.g., data exfiltration, etc.). In such a case, the security mechanism may rely on a behavioral model for a given device that it constructs over time based on the traffic observed for the device. By notifying the security mechanism that the device has migrated to a different network identifier via indication 508, the security mechanism can continue to apply its constructed behavioral model to the device under its new identifier.

Figure 6A:
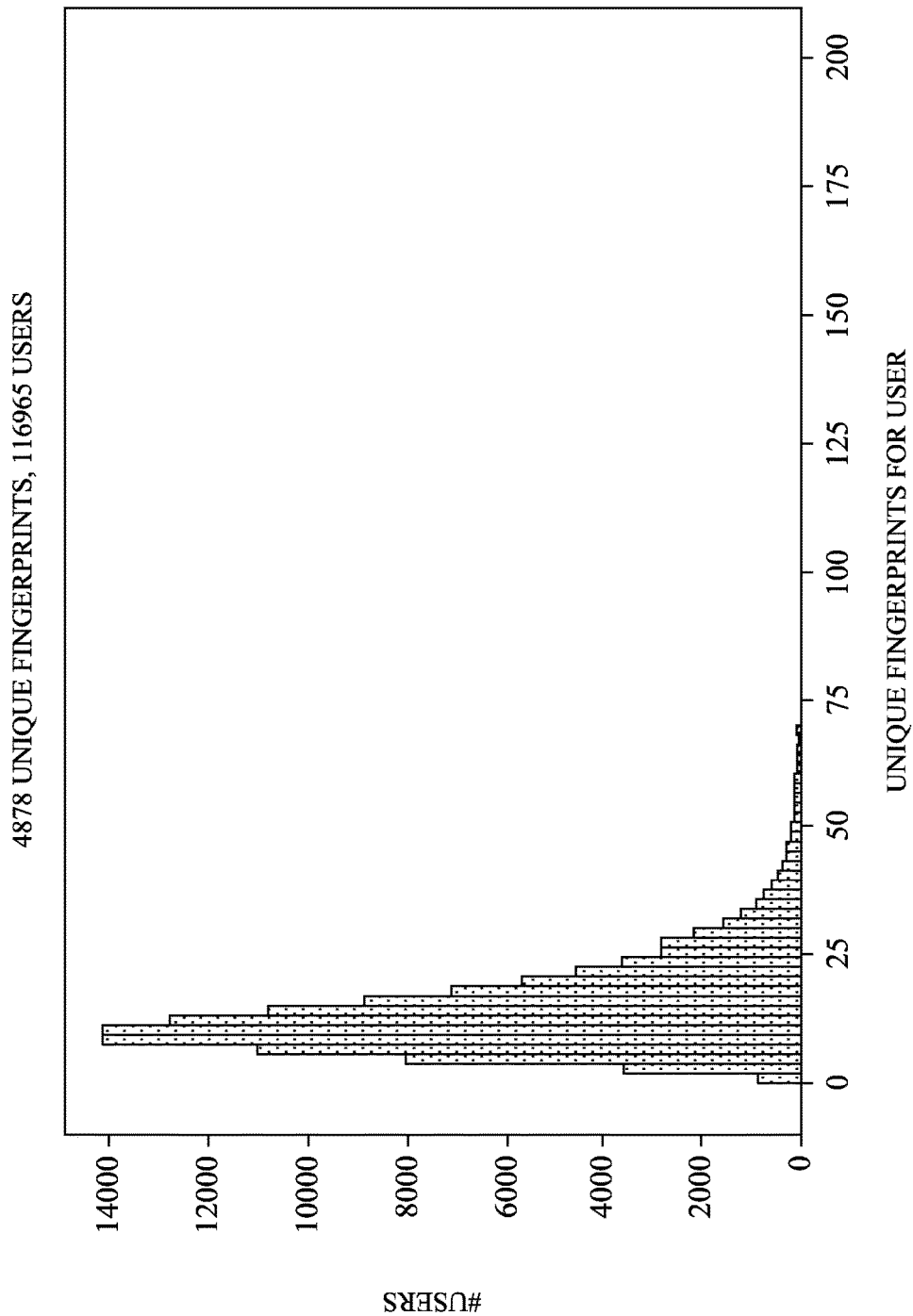
FIGS. 6A-6B illustrate example plots of preliminary test data.

A prototype was constructed, to test the efficacy of the techniques herein. Using the prototype system, as shown in plot 600 in FIG. 6A, 4878 unique TLS fingerprints were identified from network traffic across a total of 116.965 different network users. While the system was able to distinguish a relatively large number of different TLS signatures, plot 600 also shows that a typical user was only associated with a set of twenty-five or fewer TLS signatures on any given day. This demonstrates that TLS signatures can be quite useful for purposes of user identification and tracking.

Figure 6B:
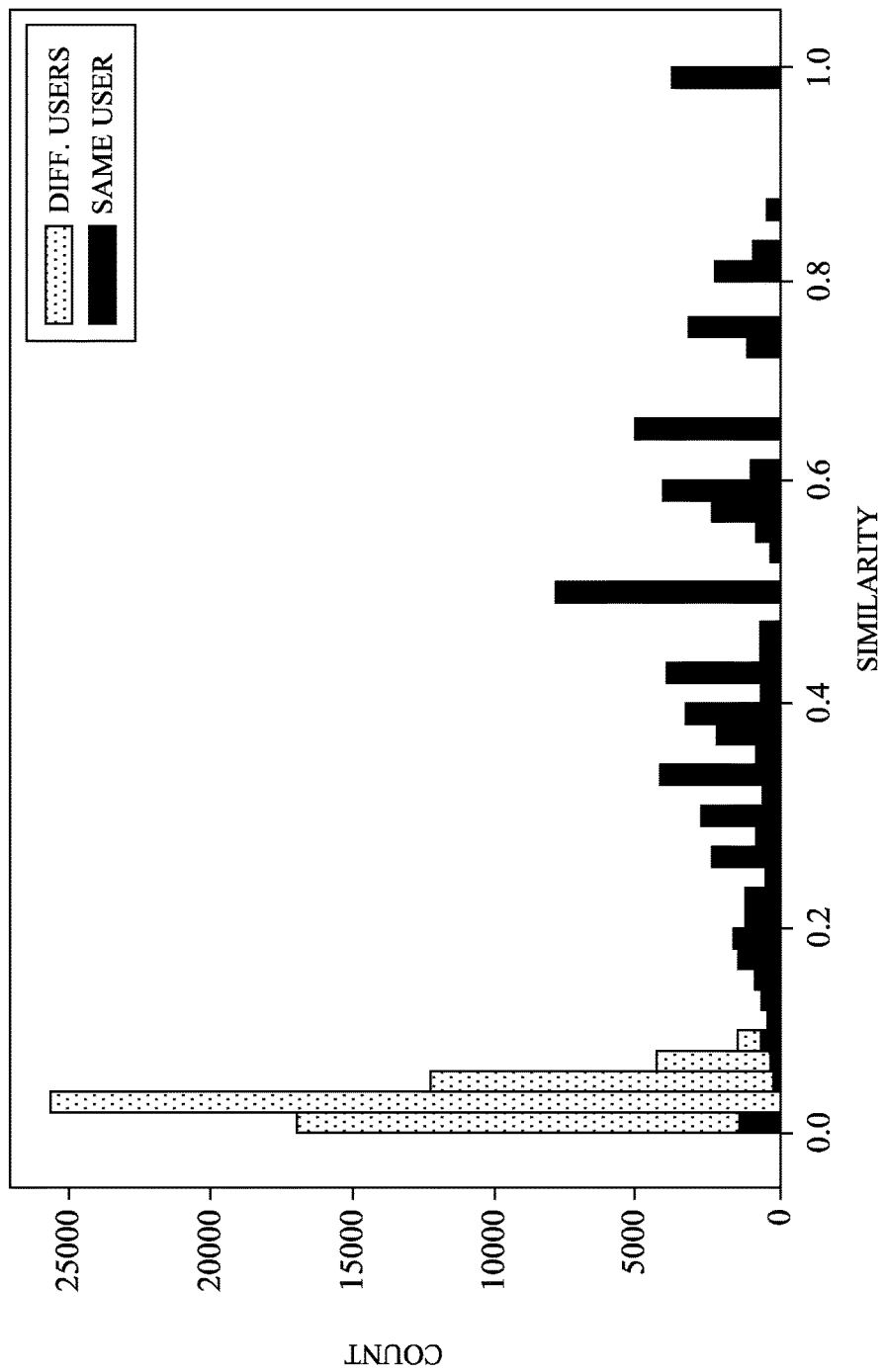

FIG. 6B illustrates a plot 610 of the distribution of similarities between samples that originated from the same device/user and between samples that originated from different devices. These results confirm that the measures of similarity between traffic samples from the same user are significantly higher than those between samples from different users, demonstrating that the efficacy of the techniques herein.

Figure 7:
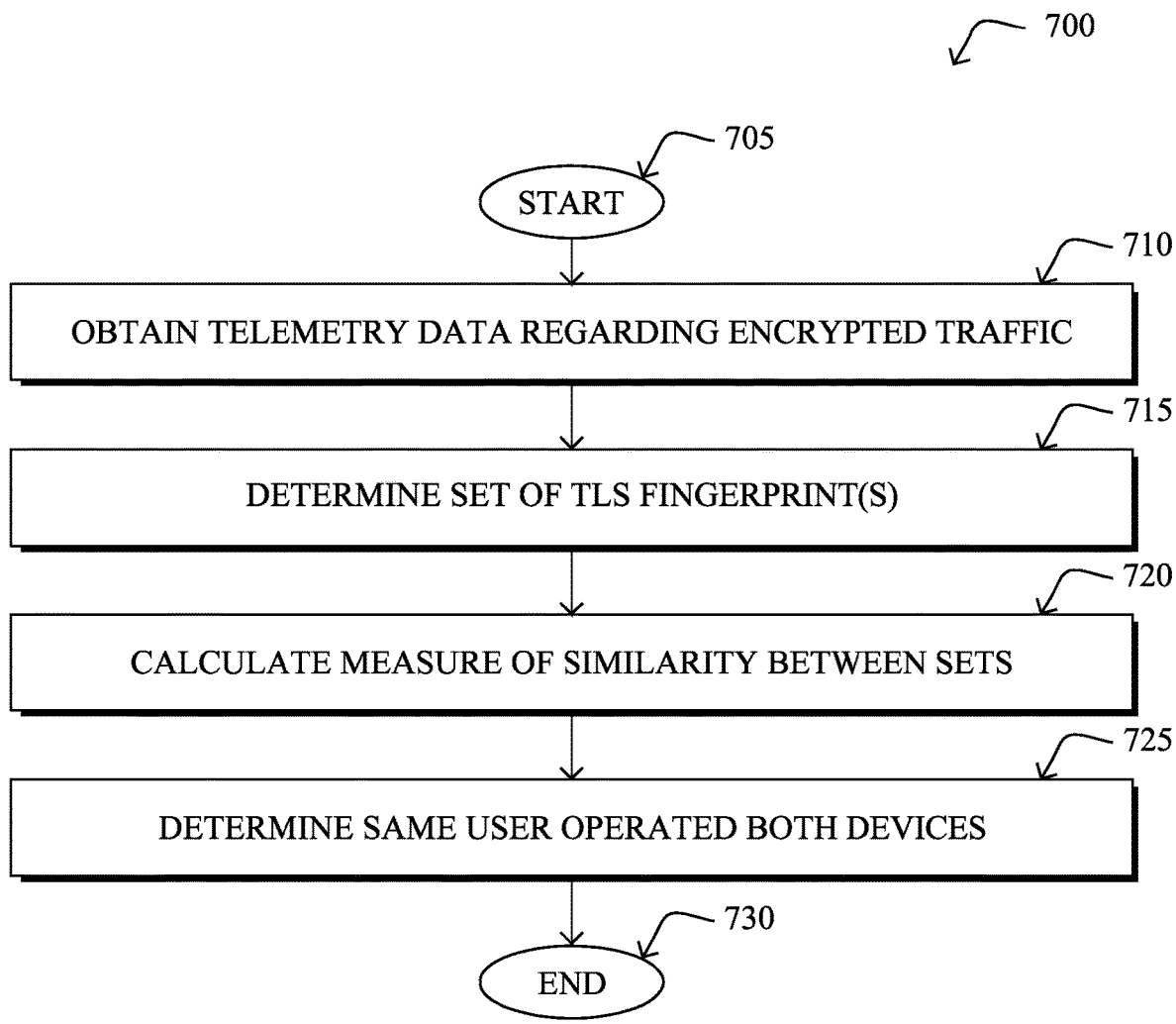
FIG. 7 illustrates an example simplified procedure for assessing encrypted traffic data in a network.

FIG. 7 illustrates an example simplified procedure for identifying a process that initiated an encrypted traffic session, in accordance with one or more embodiments described herein. For example, a non-generic, specifically configured device may perform procedure 700 by executing stored instructions, such as traffic analysis process 248, to provide a traffic analysis service to a network. The procedure 700 may start at step 705, and continues to step 710, where, as described in greater detail above, the service may obtain telemetry data regarding an encrypted traffic session in a network. In various embodiments, the telemetry data comprises TLS features of the traffic session and auxiliary information indicative of a destination address of the traffic session, a destination port of the traffic session, or a server name associated with the traffic session. For example, the service may receive the telemetry data from any number of intermediary networking devices between the endpoints of the encrypted traffic session. In a further case, the device may itself be an intermediary network device through which the session flows and capture the telemetry data. In various embodiments, the telemetry data may be captured without actually decrypting the encrypted traffic.

At step 715, as detailed above, the service may, based on the TLS features from the obtained telemetry data, a set of one or more TLS fingerprints for the traffic associated with the particular device. For example, the service may form the TLS fingerprint based on the ciphersuite offered, user agent, TLS extensions (e.g., type of encryption used, the encryption key exchange mechanism, the encryption authentication type, etc.), or any other information that can be captured from the TLS headers of traffic without decrypting the traffic. For example, the TLS features could be captured from the ClientHello and/or ServerHello messages exchanged between the particular device and a server via the network. In further embodiments, the fingerprints could also be augmented with additional information, as well, such as timing information, information regarding other protocols (e.g., DNS information, TCP header information, etc.).

At step 720, the service may calculate a measure of similarity between the set of one or more TLS fingerprints for the traffic associated with the particular device and a set of one or more TLS fingerprints of traffic associated with a second device, as described in greater detail above. In various embodiments, the measure of similarity may take the form of a Jaccard similarity, a histogram-based measure of similarity (e.g., a cosine similarity, Fullback-Leibler divergence, etc.), or a modeled probability.

At step 725, as detailed above, the service may determine, based on the measure of similarity, that the particular device and the second device were operated by the same user. In a further embodiment, the service may, based on the measure of similarity and timing information for the traffic associated with the particular device and for the traffic associated with the second device, that the particular device is the second device. In such a case, the service may use a behavioral model for the second device to determine whether the telemetry data regarding encrypted traffic associated with a particular device is anomalous. In other words, once the service has determined that the devices are the same devices, but with different network identifiers, the service can continue using its behavioral model to assess traffic from that device under its new identifier. Procedure 700 then ends at step 730.

It should be noted that while certain steps within procedure 700 may be optional as described above, the steps shown in FIG. 7 are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

The techniques described herein, therefore, allow for the identification and tracking of users across devices in a network, based on their TLS fingerprints. In some aspects, the techniques herein can be used to continue the use of a behavioral model in cases when the network identifier for a device changes.

While there have been shown and described illustrative embodiments that provide for the detection of devices and users in a network, it is to be understood that various other adaptations and modifications may be made within the spirit and scope of the embodiments herein. For example, while certain embodiments are described herein with respect to using certain models for purposes of this identification, the models are not limited as such and may be used for other functions, in other embodiments. In addition, while certain protocols are shown, such as TLS, other suitable protocols may be used, accordingly.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly, this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method comprising:
obtaining, by a traffic analysis service, telemetry data regarding encrypted traffic associated with a particular device in a network from an intermediary device through which the encrypted traffic flows between the particular device and another endpoint in the network, wherein the telemetry data comprises Transport Layer Security (TLS) features of the traffic;
determining, by the service and based on the TLS features from the obtained telemetry data, a set of one or more TLS fingerprints for the traffic associated with the particular device;
calculating, by the service, a measure of similarity between the set of one or more TLS fingerprints for the traffic associated with the particular device and a set of one or more TLS fingerprints of traffic associated with a second device; and
determining, by the service and based on the measure of similarity, that the particular device and the second device were operated by the same user.

2. The method as in claim 1, wherein the TLS features of the traffic session comprise at least one of: a ciphersuite or TLS version.

3. The method as in claim 1, wherein calculating the measure of similarity comprises:
calculating a Jaccard similarity between the set of one or more TLS fingerprints for the traffic associated with the particular device and the set of one or more TLS fingerprints of traffic associated with the second device.

4. The method as in claim 1, further comprising:
determining, based on the measure of similarity and timing information for the traffic associated with the particular device and for the traffic associated with the second device, that the particular device is the second device.

5. The method as in claim 4, further comprising:
using, by the service, a behavioral model for the second device to determine whether the telemetry data regarding encrypted traffic associated with a particular device is anomalous.

6. The method as in claim 1, further comprising:
associating an Internet Protocol (IP) address of the second device with an IP address of the particular device.

7. The method as in claim 1, wherein calculating the measure of similarity comprises:
calculating a histogram-based measure of similarity between the set of one or more TLS fingerprints for the traffic associated with the particular device and the set of one or more TLS fingerprints of traffic associated with the second device.

8. The method as in claim 1, wherein calculating the measure of similarity comprises:
modeling a probability of the set of one or more TLS fingerprints for the traffic associated with the particular device given the set of one or more TLS fingerprints of traffic associated with the second device.

9. An apparatus, comprising:
one or more network interfaces to communicate with a network;
a processor coupled to the network interfaces and configured to execute one or more processes; and
a memory configured to store a process executable by the processor, the process when executed configured to:
obtain telemetry data regarding encrypted traffic associated with a particular device in a network from an intermediary device through which the encrypted traffic flows between the particular device and another endpoint in the network, wherein the telemetry data comprises Transport Layer Security (TLS) features of the traffic;
determine, based on the TLS features from the obtained telemetry data, a set of one or more TLS fingerprints for the traffic associated with the particular device;
calculate a measure of similarity between the set of one or more TLS fingerprints for the traffic associated with the particular device and a set of one or more TLS fingerprints of traffic associated with a second device; and
determine, based on the measure of similarity, that the particular device and the second device were operated by the same user.

10. The apparatus as in claim 9, wherein the TLS features of the traffic session comprise at least one of: a ciphersuite or TLS version.

11. The apparatus as in claim 9, wherein the apparatus calculates the measure of similarity by:
calculating a Jaccard similarity between the set of one or more TLS fingerprints for the traffic associated with the particular device and the set of one or more TLS fingerprints of traffic associated with the second device.

12. The apparatus as in claim 9, wherein the process when executed is further configured to:
determine, based on the measure of similarity and timing information for the traffic associated with the particular device and for the traffic associated with the second device, that the particular device is the second device.

13. The apparatus as in claim 12, wherein the process when executed is further configured to:
use a behavioral model for the second device to determine whether the telemetry data regarding encrypted traffic associated with a particular device is anomalous.

14. The apparatus as in claim 12, wherein the process when executed is further configured to:
associate an Internet Protocol (IP) address of the second device with an IP address of the particular device.

15. The apparatus as in claim 9, wherein the apparatus calculates the measure of similarity by:
calculating a histogram-based measure of similarity between the set of one or more TLS fingerprints for the traffic associated with the particular device and the set of one or more TLS fingerprints of traffic associated with the second device.

16. The apparatus as in claim 9, wherein the apparatus calculates the measure of similarity by:
modeling a probability of the set of one or more TLS fingerprints for the traffic associated with the particular device given the set of one or more TLS fingerprints of traffic associated with the second device.

17. A tangible, non-transitory, computer-readable medium storing program instructions that cause a traffic analysis service to execute a procedure comprising:
obtaining, by the traffic analysis service, telemetry data regarding encrypted traffic associated with a particular device in a network from an intermediary device through which the encrypted traffic flows between the particular device and another endpoint in the network, wherein the telemetry data comprises Transport Layer Security (TLS) features of the traffic;
determining, by the service and based on the TLS features from the obtained telemetry data, a set of one or more TLS fingerprints for the traffic associated with the particular device;
calculating, by the service, a measure of similarity between the set of one or more TLS fingerprints for the traffic associated with the particular device and a set of one or more TLS fingerprints of traffic associated with a second device; and
determining, by the service and based on the measure of similarity, that the particular device and the second device were operated by the same user.

18. The computer-readable medium as in claim 17, wherein the TLS features of the traffic session comprise at least one of: a ciphersuite or TLS version.

19. The computer-readable medium as in claim 17, wherein the procedure further comprises:
determining, based on the measure of similarity and timing information for the traffic associated with the particular device and for the traffic associated with the second device, that the particular device is the second device.

20. The computer-readable medium as in claim 17, wherein the procedure further comprises:
using, by the service, a behavioral model for the second device to determine whether the telemetry data regarding encrypted traffic associated with a particular device is anomalous.

\* \* \* \* \*

UNITED STATES PATENT AND TRADEMARK OFFICE
CERTIFICATE OF CORRECTION

PATENT NO. : 11,245,675 B2
APPLICATION NO. : 16/686364
DATED : February 8, 2022
INVENTOR(S) : Jan Kohout et al.

Page 1 of 1

It is certified that error appears in the above-identified patent and that said Letters Patent is hereby corrected as shown below:

In the Specification

Column 8, Line 24, should read:
already known device just changed its IP address and when Column 8, Line 32, should read:
to deploy a man-in-the-middle proxy in the network. During Column 13, Line 1, should read:
"dst_ports": {

Column 15, Line 41, should read:
identified from network traffic across a total of 116,965

Column 16, Line 36, should read:
of similarity (e.g., a cosine similarity, Kullback-Leibler Signed and Sealed this
Twenty-fourth Day of May, 2022

Katherine Kelly Vidal
*Director of the United States Patent and Trademark Office*